US012567011B2

(12) United States Patent (10) Patent No.: US 12,567,011 B2
Jeong et al. (45) Date of Patent: Mar. 3, 2026

(54) BATTERY LEDGER MANAGEMENT SYSTEM AND METHOD OF BATTERY LEDGER MANAGEMENT

(71) Applicant: SK ON CO., LTD., Seoul (KR)

(72) Inventors: Da Eun Jeong, Daejeon (KR); Tae Kyun Kim, Daejeon (KR); Sun Kyu Park, Daejeon (KR); Tae Hyung Heo, Daejeon (KR)

(73) Assignee: SK ON CO., LTD., Seoul (KR)

( * ) Notice: Subject to any disclaimer, the term of this patent is extended or adjusted under 35 U.S.C. 154(b) by 104 days.

(21) Appl. No.: 17/860,898

(22) Filed: Jul. 8, 2022

(65) Prior Publication Data

US 2023/0009714 A1 Jan. 12, 2023

(30) Foreign Application Priority Data

Jul. 9, 2021 (KR) ........................ 10-2021-0090209

(51) Int. Cl.
*G06Q 10/0631* (2023.01)
*H01M 10/42* (2006.01)
*H01M 10/54* (2006.01)
(52) U.S. Cl.
CPC ...... *G06Q 10/0631* (2013.01); *H01M 10/425* (2013.01); *H01M 10/54* (2013.01); *H01M 2010/4271* (2013.01)
(58) Field of Classification Search
None
See application file for complete search history.

(56) References Cited

U.S. PATENT DOCUMENTS 10,580,224 B2 * 3/2020 Kurimoto ........... H01M 10/425
11,488,087 B2 * 11/2022 Morita ................... G06Q 10/30
(Continued)

FOREIGN PATENT DOCUMENTS

CN 114174846 A * 3/2022 ........... H01M 10/48
EP 3981642 A1 4/2022
(Continued)

OTHER PUBLICATIONS

V. G. P. G and G. Mathew, "Blockchain Based Verification Of Vehicle History For Pre-owned Vehicle Industry," 2021 International Conference on Communication, Control and Information Sciences (ICCISc), Idukki, India (Year: 2021).*
(Continued)

*Primary Examiner* — Jerry O'Connor
*Assistant Examiner* — Philip N Warner
(74) *Attorney, Agent, or Firm* — Perkins Coie LLP

(57) ABSTRACT

A battery ledger management system, includes: a data collecting unit receiving battery production information from an external source, and receiving battery information data and vehicle information data from a data collecting device; a battery ID generation and management unit generating a unique battery ID for each battery unit based on the battery production information; a state information generation and management unit generating and managing state information, information on a current usage state of the battery for the battery ID of each battery unit using the battery information data and the vehicle information data; and a usage information generation and management unit generating and managing usage information, information on a usage history of the battery for the battery ID of each battery unit using the battery information data and the vehicle information data.

11 Claims, 6 Drawing Sheets

(56) References Cited

U.S. PATENT DOCUMENTS

| | | | |
|---|---|---|---|
| 2010/0274440 A1* | 10/2010 | Kim | G07C 5/008 |
| | | | 701/31.4 |
| 2016/0303990 A1* | 10/2016 | Penilla | B60L 53/80 |
| 2017/0129361 A1* | 5/2017 | Scaringe | H02J 7/14 |
| 2019/0207267 A1* | 7/2019 | Vickery | B60L 53/80 |
| 2020/0055421 A1* | 2/2020 | Sastinsky | G06F 16/27 |
| 2020/0182937 A1* | 6/2020 | Wampler | B60L 3/12 |
| 2020/0200824 A1* | 6/2020 | Narayanaswami | H04L 67/12 |
| 2020/0286310 A1* | 9/2020 | Carver | G07C 5/0816 |
| 2021/0184273 A1 | 6/2021 | Lee et al. | |
| 2021/0192867 A1* | 6/2021 | Fang | G07C 5/0816 |
| 2021/0339649 A1* | 11/2021 | Ueno | H02J 7/007194 |
| 2021/0367277 A1* | 11/2021 | Takechi | H01M 10/482 |
| 2022/0073113 A1* | 3/2022 | Chung | G01B 11/0691 |
| 2022/0113356 A1* | 4/2022 | Kasselman | H01M 10/482 |
| 2022/0294027 A1* | 9/2022 | Choudhary | H01M 10/482 |
| 2022/0384862 A1* | 12/2022 | Tabatowski-Bush | |
| | | | H01M 10/48 |
| 2023/0012390 A1* | 1/2023 | Nemanick | H01M 10/4257 |
| 2023/0032837 A1* | 2/2023 | Laurent | G01R 31/3842 |
| 2023/0045756 A1* | 2/2023 | Hung | H04L 63/12 |
| 2023/0182575 A1* | 6/2023 | Kim | B60L 53/68 |
| | | | 701/22 |
| 2023/0242009 A1* | 8/2023 | Sastinsky | G05B 13/024 |
| | | | 700/33 |
| 2023/0278431 A1* | 9/2023 | Kim | G01R 31/392 |

FOREIGN PATENT DOCUMENTS

| | | |
|---|---|---|
| KR | 10-2016-0031071 A | 3/2016 |
| KR | 10-2019-0050881 A | 5/2019 |
| KR | 10-2021-0016134 A | 2/2021 |
| KR | 10-2021-0016797 A | 2/2021 |
| WO | 2020260623 A1 | 12/2020 |

OTHER PUBLICATIONS

European Search Report for EP Patent Application No. 22183958.2, dated Dec. 5, 2022, 9 pages.

* cited by examiner

| PROPRERTY | DETAILED ITEMS |
|---|---|
| PRODUCTION INFORMATION | PACK MANUFACTURER,PACK PRODUCT RELEASE DATE, PACK DIMENSION,PACK ENERGY CAPACITY,PACK VOLTAGE, PACK WARRANTY RANGE,THE NUMBER OF MODULES, THE NUMBER OF CELLS,CELL FORM FACTOR, CELL CHEMICAL MATERIAL CONSTITUTION,SERIAL NUMBER, MODULE MANUFACTURER,MODULE PRODUCT RELEASE DATE, MODULE DIMENSION,THE NUMBER OF CELLS,MODULE CAPACITY, COOLING METHOD,MODULE WEIGHT,HV Connection MODULE WARRANTY RANGE,SERIAL NUMBER |
| STATE INFORMATION | SOC(state of charge), SOH(state of health), PREDICT LIFESPAN,ACTUAL DRIVING DISTNACE, PREDICT ABNORMAL BEHAVIOR, BATTERY MANAGEMENT SCORE |
| USAGE INFORMATION | BATTERY ACCUMULATED DRIVING DISTANCE, THE NUMBER OF RAPID CHARGING TIMES, THE NUMBER OF SLOW CHARGING TIMES, DIAGNOSIS RESULT HISTORY,MAINTENANCE/REPLACEMENT HISTORY, MONTHLY BATTERY MANAGEMENT SCORE HISTORY,LIFECYCLE, BATTERY NOTIFICATION HISTORY |

FIG. 3

BATTERY LEDGER MANAGEMENT SYSTEM AND METHOD OF BATTERY LEDGER MANAGEMENT

CROSS-REFERENCE TO RELATED APPLICATION(S)

This application claims the benefit under 35 USC 119(a) of Korean Patent Application No. 10-2021-0090209 filed on Jul. 9, 2021 in the Korean Intellectual Property Office, the entire disclosure of which is incorporated herein by reference for all purposes.

BACKGROUND

The present disclosure relates to a battery ledger management system.

As a demand for hybrid vehicles or electric vehicles (hereinafter referred to as 'vehicles') increases, the demand for batteries also increases. Accordingly, it may be desirable, in some applications, to reuse parts of a battery that is used for other purposes by rearranging waste batteries recovered from vehicles, and to recycle a battery by decomposing a lithium-ion battery to extract raw materials such as nickel, cobalt, manganese, and the like, therefrom. However, since a battery product code issued by a battery manufacturer is issued for the purpose of producing products, a system is different for each business operator and does not include information for managing an entire lifecycle of the battery.

SUMMARY

An aspect of the present disclosure is to provide a battery ledger management system assigning a unique and meaningful battery ID to each battery unit, and managing battery ledger information over an entire lifecycle of a battery as the battery is produced (manufacturing process), sold, used, reused, and recycled (discarded) for each battery unit.

According to an aspect of the present disclosure, a battery ledger management system, includes: a data collecting unit receiving battery production information from an external source, and receiving battery information data and vehicle information data from a data collecting device; a battery ID generation and management unit generating a unique battery ID for each battery unit based on the battery production information; a state information generation and management unit generating and managing state information, information on a current usage state of the battery for the battery ID of each battery unit using the battery information data and the vehicle information data; and a usage information generation and management unit generating and managing usage information, information on a usage history of the battery for the battery ID of each battery unit using the battery information data and the vehicle information data.

According to an aspect of the present disclosure, a method of battery ledger management, comprises operations of: generating a battery ID for a battery; generating battery ledger information of a first lift cycle of the battery; updating battery ledger information of a second lifecycle of the battery, when the battery is reused; and updating recycling information of the battery to battery ledger information, when the battery is recycled, wherein the lifecycle means a period in which a battery is used for the same purpose in an entire lifecycle of the battery, and the battery ledger information is tracked over the entire lifecycle of the battery based on the battery ID.

BRIEF DESCRIPTION OF DRAWINGS

The above and other aspects, features, and advantages of the present disclosure will be more clearly understood from the following detailed description, taken in conjunction with the accompanying drawings, in which:

FIG. 3 is a diagram illustrating battery ledger information according to an embodiment of the present disclosure.

DETAILED DESCRIPTION

The details of examples of certain embodiments of the present disclosure are included in the detailed description and drawings.

Various features of the present disclosure and methods of achieving the same along with certain advantages in connection with specific implementations of the disclosed features will become apparent with reference to the embodiments described below in detail in conjunction with the accompanying drawings.

Figure 1:
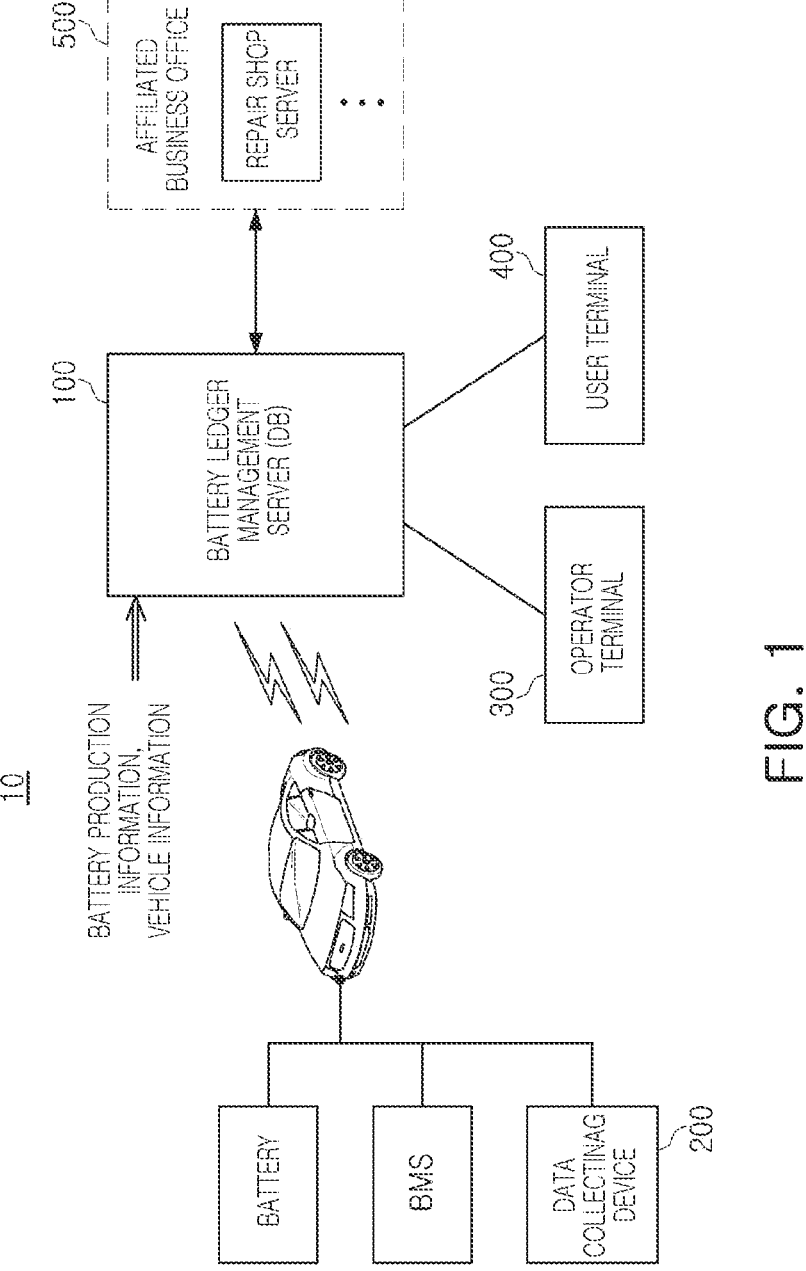
FIG. 1 is a block diagram illustrating a battery ledger management system according to an embodiment of the present disclosure.

FIG. 1 is a block diagram illustrating a battery ledger management system according to an embodiment of the present disclosure.

Referring to FIG. 1, a battery ledger management system 10 may refer to a system providing a service for managing battery ledger data, and may include a battery ledger management server 100, a data collecting device 200, an operator terminal 300, a user terminal 400, and an affiliated business office server 500. The vehicle may include a battery charging and holding electrical energy, driving energy, and a battery management system (BMS) for managing the battery, and the BMS may monitor a state of the battery to serve to automatically manage the battery to be maintained or used in under optimal conditions. The data collecting device 200 may be connected to the BMS, or the like, to receive various state information of the battery and output the same externally. The data collecting device 200 may be an on-board diagnostic (OBD) device or an on-board diagnostic version II (OBD-II) device mounted in an electric vehicle.

The battery ledger management server 10 may receive battery production information from the outside and assign a unique and meaningful battery ID to each battery unit. A battery unit may mean a battery pack, a battery module, or a battery cell. For example, a secondary battery pack for an electric vehicle battery may include a plurality of battery modules in which a plurality of unit battery cells are disposed. The battery ID may refer to a unique code assigned to each battery pack, battery module, or battery cell, and may be maintained over the entire lifecycle of the battery.

The battery ledger information may refer to battery information collected over an entire lifecycle of a battery for each battery ID assigned to each battery unit. The entire lifecycle of a battery may mean a cycle from when the battery is first produced until the battery is sold, used, reused, and recycled (discarded). For example, a battery used in an electric vehicle may be reused for an energy storage system (ESS), or may be recycled after being decomposed into a unit of chemical materials.

The battery ledger management system 10 may register battery information of various manufactures using the battery ledger management server 100, and provide a service that can manage and search the battery ledger data collected over the entire lifecycle of the battery through the battery ID assigned to each battery unit.

The data collecting device 200 may transmit vehicle information data and battery information data to the battery ledger management server 100 in real time through short-range communication (Wi-Fi, Bluetooth™) or mobile communication network (LTE).

The operator is a person who manages and operates a plurality of vehicles, and may be a fleet management business operator, a rental car business operator, a corporate vehicle manager, an insurance company, and the like. The operator terminal 300 may be a personal computer (PC) of the operator.

The user may be a personal vehicle owner or driver. The user terminal 400 may include a user's mobile phone, a smartphone, a laptop computer, a tablet PC, a wearable device, and the like.

Depending on the type of operators and users, the search results may target all managed vehicles, or may be limited to driving vehicles or owned vehicles.

The affiliated business office server 500 may include a repair shop server for diagnosing a vehicle or a battery, and repairing or replacing the vehicle or battery.

According to an embodiment of the present disclosure, the battery ID may serve as an access key for searching and inquiring about ledger information of the corresponding battery. For example, when a user inputs a battery ID, the battery ID may provide a data platform that can search battery production information, state information, and usage information corresponding to the battery ID.

In addition, since the battery ledger data can be tracked over the entire lifecycle of a battery for each battery unit, it is possible to collect and share information necessary for battery transaction, diagnosis, and residual price setting among business operators.

Figure 2:
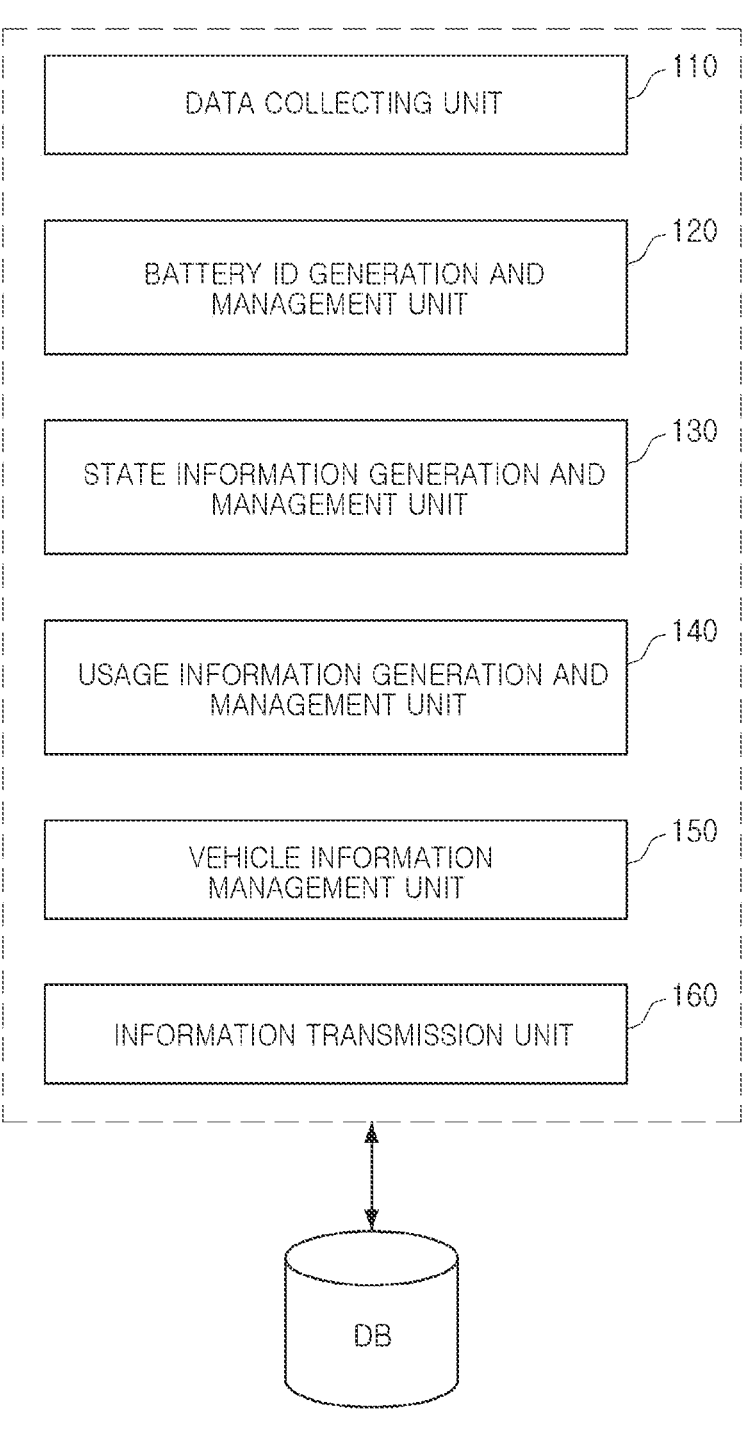
FIG. 2 is a block diagram illustrating a battery ledger management server according to an embodiment of the present disclosure.

FIG. 2 is a block diagram illustrating a battery ledger management server according to an embodiment of the present disclosure.

Referring to FIG. 2, the battery ledger management server 100 may include a data collecting unit 110, a battery ID generation and management unit 120, a state information generation and management unit 130, a usage information generation and management unit 140, a vehicle information management unit 150, and an information transmission unit 160.

The data collecting unit 110 may receive battery production information and vehicle information from an external source. The battery ID generation and management unit 120 may generate and manage a battery ID for each battery unit based on the battery production information. The state information generation and management unit 130 and the usage information generation and management unit 140 may generate and manage battery state information and battery use information for each battery ID.

FIG. 3 is a view illustrating battery ledger information according to an embodiment of the present disclosure.

Referring to FIG. 3, battery ledger information may include production information, state information, and usage information.

The production information may refer to information generated when the battery is produced. Since the production information is unique information for each battery, the production information has an immutable property. Accordingly, the production information may be used to generate a battery ID, which can be maintained over the entire lifecycle of the battery.

For example, the production information may include a pack profile and a module profile. Details may include a pack manufacturer, a pack product release, a pack dimension, a pack energy capacity, a pack voltage, a pack warranty range, the number of modules, the number of cells, a cell form factor, a cell chemical composition, a serial number, and the like. The pack dimension indicates a width, a length, and a height of the battery pack, and a unit thereof may be represented in mm. The Pack Energy means a battery capacity, and may be, for example, 64 kWh. The Pack Voltage may mean a voltage measured at both ends of an output terminal of the battery pack. The Pack Warranty means a free warranty period, and a unit thereof may be represented in year/km. The Number of Modules may mean the number of modules, and the Number of Cells may mean the number of cells. The Cell Form means a shape of a cell, and may be, for example, any one of a pouch type, a circular type, and a prismatic type. The Cell Chemistry means a battery positive electrode material, for example, may be NCM523. The serial number may mean a randomly generated number.

Details of the module profile may include a module manufacturer, a module product release date, a module dimension, the number of cells, module capacity, a cooling method, a module weight, HV connection, a module warranty range, a serial number, and the like. Cooling may be indirect liquid, and high voltage (HV) Connection may be laser welding.

The battery ID may be a hybrid code in which a first classification code and a second classification code are mixed. The first classification code may be a serial number for classifying batteries having the same production information, and may mean a meaningful code. The second classification code may be a code reflecting battery production information except for the serial number, and may mean a meaningless code. Details of production information may be indicated by numbers or alphabets.

For example, in the case of a battery pack including a plurality of battery modules, a battery ID for a battery pack may be generated based on battery production information, and a battery ID for each of the battery modules may be generated in connection with the battery ID for the battery pack. For example, a battery ID for each of the battery modules may be generated by adding different serial numbers to the battery ID for the battery pack.

The battery ID may be generated and managed not only when the battery unit may be directly accessed, such as battery production, vehicle stocking, battery recovery, and the like, but also when it can be accessed indirectly through a current battery user.

According to an embodiment of the present disclosure, by assigning a unique identification system to each battery unit of a battery pack, a battery module, or a battery cell, there is an effect of intuitively and efficiently managing a battery.

Unlike the production information, state information and usage information have properties that vary according to battery usage. The state information may refer to information on a current usage state of a battery generated for each battery ID using battery information data and vehicle information data. The usage information may refer to information on a usage history of a battery generated for each battery ID by using battery information data and vehicle information data. The battery information data and the vehicle information data may include a battery voltage, a current, a temperature, SOC, SOH, rapid acceleration, rapid deceleration, a regenerative braking value, an accumulated driving distance of vehicle, charging information, and the like, output from BMS, a micro controller unit (MCU), and the like.

Details of the state information may include state of charge (SOC), state of health (SOH), remaining lifespan, an actual driving distance, abnormal behavior, a battery management score, and the like. Details of the usage information may include an accumulated battery driving distance, the number of rapid charging times, the number of slow charging times, diagnosis result history, maintenance/replacement history, monthly management score history, lifecycle, and the like.

Figure 4:
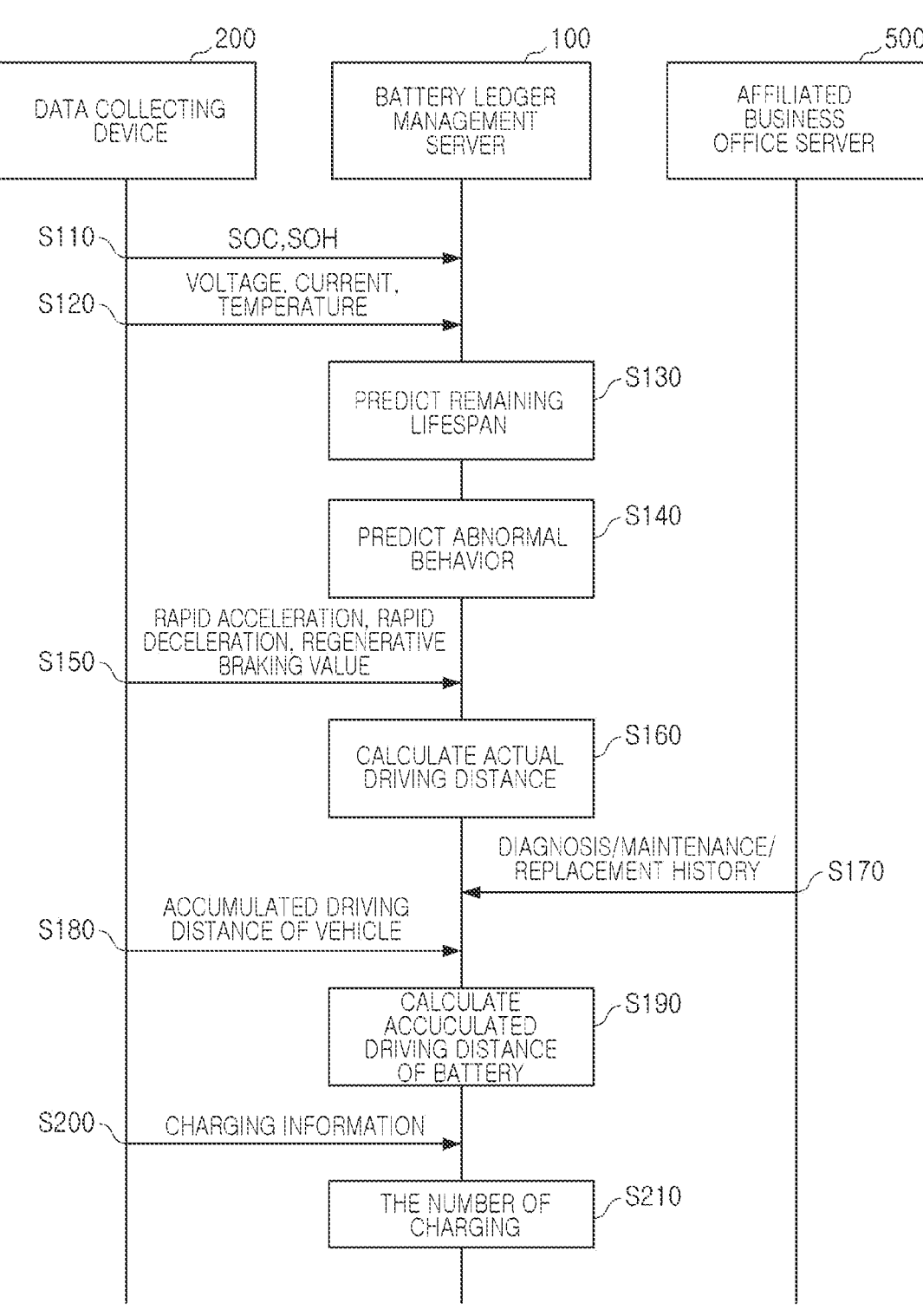
FIG. 4 is a data flow diagram illustrating a method of operating a battery ledger management system according to an embodiment of the present disclosure.

FIG. 4 is a data flow diagram illustrating a method of operating a battery ledger management system according to an embodiment of the present disclosure.

Referring to FIGS. 2 and 4, a data collecting unit 110 may receive a state of charge (SOC) and a state of health (SOH) generated by a BMS through the data collecting device 200 (S110). The SOC may mean a remaining capacity (%), an amount currently charged in the battery, and the SOH may mean a current health state (%) of the battery. The SOC and SOH may be stored in a database DB.

The SOH of the battery falls below a certain level (e.g., 80%), which means a state in which the battery may no longer be used as a battery of a vehicle. Remaining lifespan may mean a value predicting a battery life, which is a time for the SOH to reach a certain level. The data collecting unit 110 may receive voltage, current, and temperature data of the battery through the data collecting device 200 (S120), and the state information generation and management unit 130 may predict remaining lifespan of the battery from the voltage, current, and temperature data of the battery using an artificial intelligence (AI)-based SOH prediction algorithm (S130). The remaining lifespan of the battery may be stored in the database DB.

Abnormal behavior of the battery means voltage imbalance between battery cells, temperature change during battery charging, and the like. The state information generation and management unit 130 may predict abnormal behavior of the battery from voltage, current, and temperature data of the battery using an artificial intelligence (AI)-based prediction algorithm (S140). The abnormal behavior of the battery may be stored in the database DB.

An actual driving distance means an estimated distance that a vehicle may travel with the currently charged battery capacity. The data collecting unit 110 may receive SOC, rapid acceleration, rapid deceleration, and regenerative braking values generated by the BMS through the data collecting device 200 (S150). The state information generation and management unit 130 may calculate by reflecting battery external factors, such as weather, vehicle loading capacity, and personal driving habits, as well as the SOC generated by the BMS (S160). A personal driving habit may be analyzed using data such as rapid acceleration, rapid deceleration, regenerative braking, and the like, received from the data collecting device 200. For example, the personal driving habit may mean a user profile such as whether the driver is a person who drives recklessly. The actual driving distance may be stored in the database DB.

A battery management score may mean that a SOH management state is scored based on a driver's charging habit, a driving habit, and a parking habit, which are factors affecting battery deterioration. The battery management score may be stored in the database DB.

For example, the driver's charging habit may include the number of rapid charging times, the number of slow charging times, a ratio of the number of rapid charging and the number of slow charging, the number of charging times from SOC 20% or less to SOC 100%, a time left after charging to SOC 100%, the number of times the battery is charged in a high-temperature condition of the battery, and the number of times the battery is charged when a temperature difference between an external temperature and a battery is a certain temperature (e.g., 20° C.) or higher, and the like.

The driving habit of the driver may include the number of times of rapid acceleration while driving a vehicle, the number of times of rapid deceleration while driving the vehicle, an operating time in a high-temperature environment (e.g., 45° C.), and the like.

The driver's parking habit may include a time for which the vehicle has been left in direct sunlight and a high-temperature environment, the number of times the vehicle has been completely discharged (e.g., SOC 0%), and the like.

The battery management score may be calculated in such a manner that points are deducted from a total score whenever any one of factors affecting battery deterioration is applied. In another embodiment, a driver's charging habit score, a driving habit score, and a parking habit score may be respectively calculated, and the battery management score may be calculated as the sum or average of the charging habit score, driving habit score, and parking habit score. In addition, the total battery management score may be calculated by reflecting the remaining lifespan, SOF of BMS, and the like, predicted through an artificial intelligence (AI)-based prediction algorithm, in the battery management score.

The data collecting unit 110 may receive an accumulated driving distance of the vehicle through the data collecting device 200 (S180), and may receive a battery replacement history from an affiliated business office server 500 (S170). The battery replacement history may mean a history such as which battery pack was replaced and when for each of a plurality of vehicle numbers in a single battery ID. According to the lifecycle, the plurality of vehicle numbers may be replaced with a serial number of a product using batteries.

The usage information generation and management unit 140 may calculate the accumulated driving distance of the corresponding battery by using the current accumulated driving distance of the vehicle and the accumulated driving distance of the vehicle at the time at which the battery is replaced (S190). If the battery has never been replaced, the accumulated driving distance of the battery is equal to the accumulated driving distance of the vehicle. The data collecting unit 110 may further receive a diagnosis and maintenance history of the battery from the affiliated business office server 500. The accumulated driving distance, diagnosis, maintenance, and replacement history of the battery may be stored in the database DB.

The data collecting unit 110 may receive charging information (e.g., charging current amount) through the data collecting device 200 (S200). The usage information generation and management unit 140 may calculate the number of fast charging and slow charging times based on the charging information (S210). The number of fast charging times and the number of slow charging times may be stored in the database (DB).

The usage information generation and management unit 140 may calculate a monthly battery management score from the battery management scores stored in the database DB. The monthly battery management score history may be stored in the database.

The lifecycle may mean a period from when the battery is first registered in the battery ledger management server 100 to when the battery life ends, that is, a period in which the battery is used for the same purpose in the entire lifecycle of the battery. For example, a first lifecycle may mean a period in which a battery is first registered in the battery ledger management server 100 and used in a vehicle, a second lifecycle may mean a period in which the battery is reused as an ESS after the battery is used after being used in a vehicle, and a third lifecycle may mean a period in which the battery is reused as an ESS and then used in a forklift. A factor for dividing whether the corresponding battery is in a first lifecycle or a second lifecycle may be stored in the database DB, and state information and usage information of the battery may be stored for each lifecycle.

In order to manage battery ledger data for each lifecycle, a time at which the battery is first registered in the battery ledger management server 100, a time at which the battery is updated in the battery ledger management server 100 when the battery is reused, a time at which the battery ledger management data is updated in the battery ledger management server 100 when the battery is recycled, and the like may be stored in the database DB.

A battery notification history means a notification history for the battery such as a charging state of the battery, completion of charging of the battery, and detection of abnormality in the battery, and the usage information generation and management unit 140 may divide the battery notification history into a notification time and a notification type, and store the same in the database DB.

The data collecting unit 110 may receive vehicle information from the outside, and the vehicle information management unit 150 may store the vehicle information in the database DB.

Figure 5:
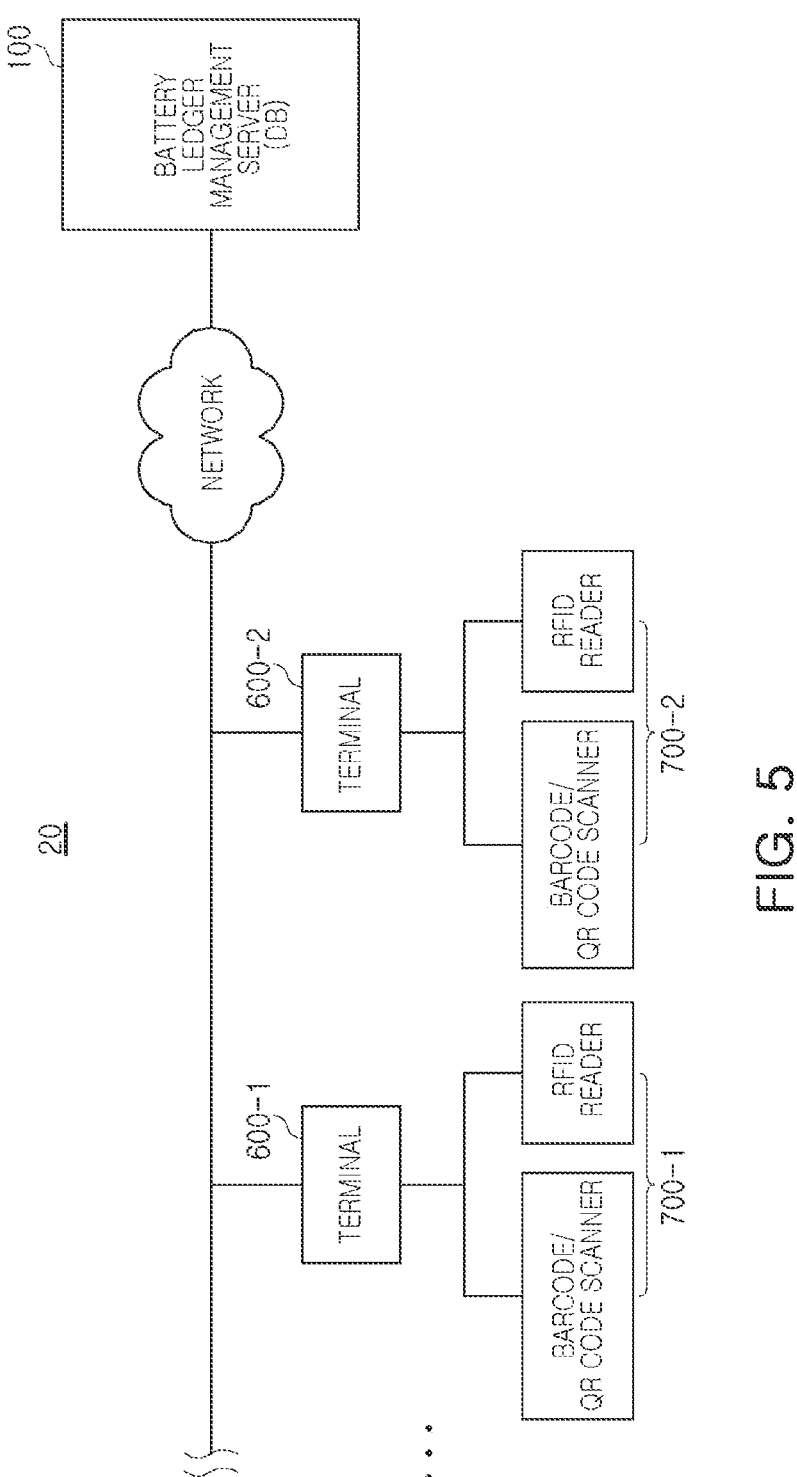
FIGS. 5 and 6 are diagrams for illustrating a battery ledger information management procedure over an entire lifecycle of a battery according to an embodiment of the present disclosure.
Figure 6:
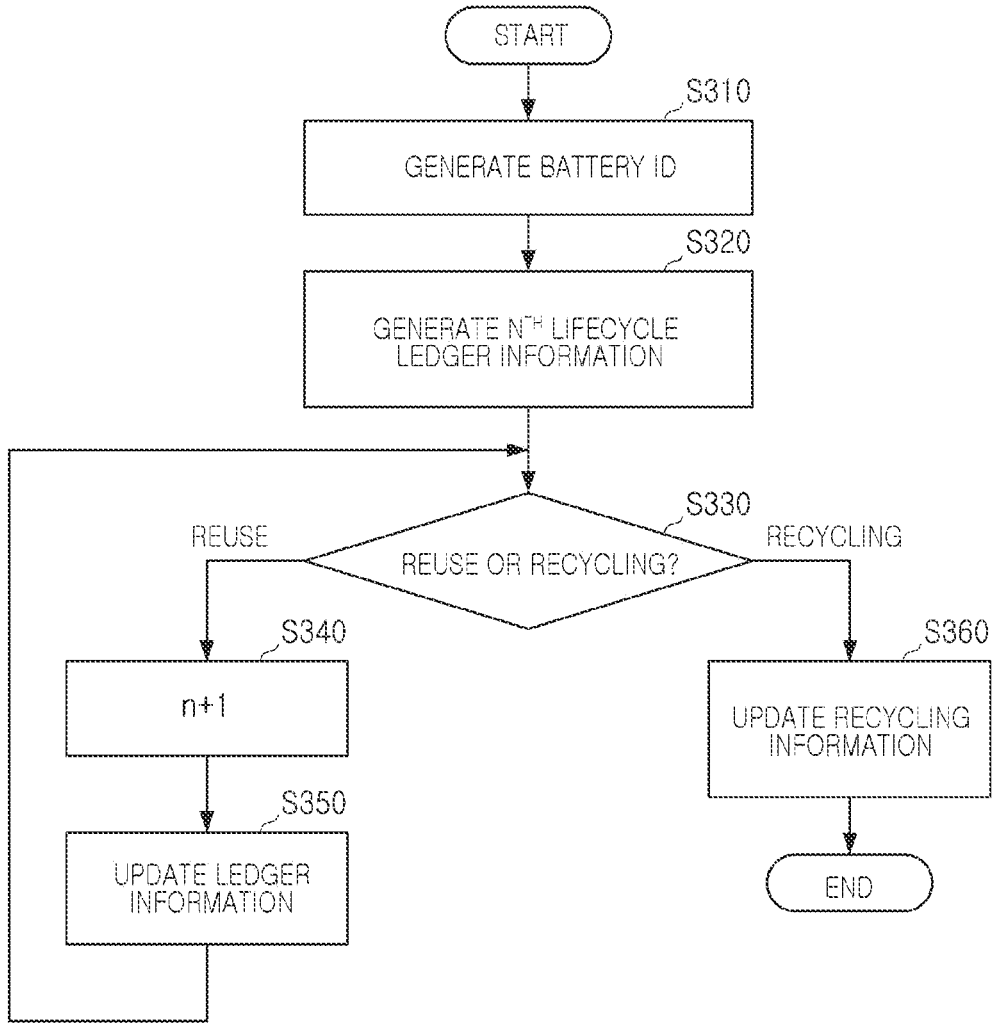

FIGS. 5 and 6 are diagrams for illustrating a battery ledger information management procedure over an entire lifecycle of a battery according to an embodiment of the present disclosure.

Referring to FIG. 5, a battery ledger management system 20 may update battery state information and battery usage information from when a battery is first registered in a battery ledger management server 100 to when the battery is reused or recycled. Accordingly, battery ledger data may be tracked over the entire lifecycle of the battery for each battery unit.

In order to track and manage the battery based on a battery ID, a sticker containing battery ID code information may be attached to each battery unit. The battery ID may be an identification code of any one of a barcode, a QR code, and an RFID tag. The identification code may be read through scanning devices 700-1 and 700-2 connected to terminals 600-1 and 600-2 at necessary times such as battery input/export, battery reuse, and battery recycling.

Referring to FIGS. 5 and 6, a battery may be produced and a battery ID may be assigned to each battery unit (S310). The battery may be registered in the battery ledger management server 100 for the first time and may be used in a vehicle. Accordingly, the battery ledger management server 100 may generate battery ledger information of a first lifecycle (S320).

After a battery is used in a vehicle, the battery may be reused or recycled (discarded). When the battery is reused in an ESS (reuse in S330), the battery ledger management server 100 may update battery ledger information of a second lifecycle (S340).

When the battery is reused in a forklift after the battery is used in the ESS (reuse in S330), the battery ledger management server 100 may update battery ledger information of a third lifecycle (S340).

When the battery is recycled after being used in the forklift (recycling in S330), the battery ledger management server 100 may update recycling information to the battery ledger information (S360).

When disassembling and disposing of batteries for recycling, battery ledger information may be used for analysis purposes and then destroyed.

According to an embodiment of the present disclosure, the battery ledger information may be tracked over the entire lifecycle of the battery based on the battery ID. The tracking of battery ledger information is applicable not only to vehicles, but also to new batteries for various uses such as ESS.

In addition, the tracking may be used to check the quality of the battery, and to trace a cause and responsibility in case of defects or accidents. The tracking may be used as a basis for product quality certification future use classification when dealing with batteries for reuse or recycling, and may be used for battery tracking and management in Enterprise Resource Planning (ERP).

As set forth above, according to an embodiment of the present disclosure, since battery ledger data may be tracked over an entire lifecycle of a battery for each battery unit, information necessary for battery transaction, diagnosis, residual price setting, and the like, among operators, may be collected and shared.

In addition, by assigning a unique identification system to each battery unit of a battery pack, a battery module, or a battery cell, a battery may be intuitively and efficiently managed.

While this disclosure includes specific examples, variations and enhancements of the disclosed examples for certain embodiments and other embodiments may be made based on what is disclosed in this patent document.

What is claimed is:

1. A battery ledger management system, comprising a battery ledger management server disposed outside a vehicle, wherein the battery ledger management server comprises:

a data collector in communication with an external source and a data collecting device disposed in the vehicle to receive battery production information from the external source and receive, in real time through a short-range communication or a mobile communication network, battery information data and vehicle information data from the data collecting device disposed outside the vehicle;

a battery identity (ID) manager coupled to receive the battery production information to generate a unique battery ID for each battery unit based on the battery production information;

a state information manager, based on the battery information data and the vehicle information data received in real time from the data collecting device disposed in the vehicle, to generate and maintain state information on a current usage state of the battery corresponding to the unique battery ID of each battery unit based on the battery information data and the vehicle information data; and a usage information manager, based on the battery information data and the vehicle information data received in real time from the data collecting device disposed in the vehicle, to generate and maintain usage information on a usage history of the battery corresponding to the unique battery ID of each battery unit based on the battery information data and the vehicle information data, wherein each battery unit is a battery pack including battery modules, and the battery production information comprises two or more of battery pack manufacturer information, a battery pack product release date, a battery pack dimension, a battery pack energy capacity, a battery pack voltage, a battery pack warranty range, the number of battery modules, the number of battery cells, a battery cell form factor, a battery cell chemical material composition, a battery module manufacturer information, a battery module product release date, a battery module dimension, the number of battery cells, a battery module capacity, a cooling method for battery, a battery module weight, high voltage (HV) connection, or a battery module product warranty range, wherein the data collector in the battery ledger management server receives, from an affiliated business office server different from the battery ledger management server, at least one of a battery replacement history of a corresponding battery unit or a diagnosis and maintenance history of the corresponding battery unit, and wherein the usage information manager calculates an accumulated driving distance of the corresponding battery unit based on a current accumulated driving distance of the vehicle and an accumulated driving distance of the vehicle at a time of battery replacement based on the battery replacement history, wherein the state information includes a battery management score, wherein the battery management score is calculated by deducting points from a total score whenever one or more factors affecting battery deterioration are present, or is calculated based on a combination of a driver's charging habit score, a driving habit score, and a parking habit score.

2. The battery ledger management system of claim 1, wherein the battery unit includes any one of a battery pack, a battery module, and a battery cell.

3. The battery ledger management system of claim 1, wherein the battery ID comprises a first classification code and a second classification code, the first classification code being a code reflecting the battery production information, and the second classification code being a serial number for classifying batteries having the same battery production information.

4. The battery ledger management system of claim 1, wherein the state information comprises at least one of state of charge (SOC), state of health (SOH), a remaining lifespan, an actual driving distance, abnormal driving behavior, and a battery management score.

5. The battery ledger management system of claim 1, wherein the usage information comprises at least one of an accumulated driving distance of the battery, the number of occasions of rapid charging, the number of occasions of slow charging, a battery diagnosis result history, a battery maintenance history, a battery replacement history, a monthly battery management score history, and a battery lifecycle.

6. The battery ledger management system of claim 5, wherein:

the battery lifecycle indicates a period in which a battery is used for a certain purpose in an entire lifecycle of the battery; and state information and usage information of the battery are updated for each lifecycle.

7. The battery ledger management system of claim 1, wherein the battery ID is an identification code of any one of a barcode, a quick response (QR) code, and a radio frequency identification (RFID) tag.

8. A method of battery ledger management, comprising:

generating, by a battery ledger management server disposed outside a vehicle, a battery identity (ID) for a battery;

generating, by the battery ledger management server, battery ledger information of a first lifecycle of the battery in a case that the battery is not a reused battery;

updating, by the battery ledger management server, battery ledger information of a second lifecycle of the battery in a case that the battery is a reused battery; and updating, by the battery ledger management server, recycling information of the battery to battery ledger information in a case that the battery is a recycled battery, wherein the lifecycle indicates a period in which a battery is used for a certain purpose in an entire lifecycle of the battery, and the battery ledger information is tracked over the entire lifecycle of the battery based on the battery ID, wherein the battery ledger information comprises at least one of battery production information, battery state information, or battery usage information, wherein the battery production information is received from an external source, and the battery state information and the battery usage information are received from a data collecting device disposed in the vehicle wherein the generating of the battery ledger information comprises:

receiving battery information data and vehicle information data from the data collecting device in real time through a short-range communication or a mobile communication network;

receiving, by the battery ledger management server, from an affiliated business office server different from the battery ledger management server, at least one of a battery replacement history of a corresponding battery unit or a diagnosis and maintenance history of the corresponding battery unit;

generating state information on a current usage state corresponding to the battery ID of each battery unit based on the battery information data and the vehicle information data; and generating usage information on the usage history corresponding to the battery ID of each battery unit based on the battery information data and the vehicle information data, wherein the usage information manager calculates an accumulated driving distance of the corresponding battery unit based on a current accumulated driving distance of the vehicle and an accumulated driving distance of the vehicle at a time of battery replacement based on the battery replacement history, wherein each battery unit is a battery pack including battery modules, and the battery production information comprises two or more of battery pack manufacturer information, a battery pack product release date, a battery pack dimension, a battery pack energy capacity, a battery pack voltage, a battery pack warranty range, the number of battery modules, the number of battery cells, a battery cell form factor, a battery cell chemical material composition, a battery module manufacturer information, a battery module product release date, a battery module dimension, the number of battery cells, a battery module capacity, a cooling method for battery, a battery module weight, high voltage (HV) connection, or a battery module product warranty range, wherein the state information includes a battery management score, wherein the battery management score is calculated by deducting points from a total score whenever one or more factors affecting battery deterioration are present, or is calculated based on a combination of a driver's charging habit score, a driving habit score, and a parking habit score.

9. The method of the battery ledger management of claim 8, wherein the battery ID is a unique code generated for each battery unit based on the battery production information.

10. The method of the battery ledger management of claim 8, wherein the battery ID is an identification code, any one of a barcode, a QR code, and an RFID tag.

11. The method of the battery ledger management of claim 8, wherein the updating of the battery ledger information includes updating the state information and the usage information for each lifecycle.

\* \* \* \* \*